US011377163B2

(12) United States Patent
Liu

(10) Patent No.: US 11,377,163 B2
(45) Date of Patent: Jul. 5, 2022

(54) BICYCLE SADDLE AND METHOD FOR MAKING THE SAME

(71) Applicant: PRAXIS INTERNATIONAL PTE. LTD., Singapore (SG)

(72) Inventor: Fang-Ling Liu, Huatan Township, Changhua County (TW)

(73) Assignee: PRAXIS INTERNATIONAL PTE. LTD., Singapore (SG)

( * ) Notice: Subject to any disclaimer, the term of this patent is extended or adjusted under 35 U.S.C. 154(b) by 176 days.

(21) Appl. No.: 16/934,958

(22) Filed: Jul. 21, 2020

(65) Prior Publication Data

US 2021/0347427 A1    Nov. 11, 2021

(30) Foreign Application Priority Data

May 6, 2020    (TW) .................................. 109115078

(51) Int. Cl.
| | | |
|---|---|---|
| *B62J 1/08* | (2006.01) | |
| *B62J 1/18* | (2006.01) | |
| *B29C 39/02* | (2006.01) | |
| *B29C 39/00* | (2006.01) | |
| *B29L 31/30* | (2006.01) | |

(52) U.S. Cl.
CPC ............... *B62J 1/08* (2013.01); *B29C 39/003* (2013.01); *B29C 39/026* (2013.01); *B62J 1/18* (2013.01); *B29L 2031/3094* (2013.01)

(58) Field of Classification Search
CPC .. B62J 1/08; B62J 1/18; B29C 39/003; B29C 39/026; B29L 2031/3094
See application file for complete search history.

(56) References Cited

FOREIGN PATENT DOCUMENTS

CN          104816769 A      8/2015

OTHER PUBLICATIONS

Search Report appended to an Office Action, which was issued to Taiwanese counterpart application No. 109115078 by the TIPO dated Nov. 20, 2020 with an English translation thereof (2 pages).

*Primary Examiner* — Philip F Gabler
(74) *Attorney, Agent, or Firm* — Hamre, Schumann, Mueller & Larson, P.C.

(57) ABSTRACT

A bicycle saddle includes a stack of fiber fabrics, a braided fiber bundle including two bundle segments, and a cured member. The cured member includes a first cured portion and a second cured portion. The first cured portion is configured to embed the stack of fiber fabrics therein to form a shell having a front nose portion and a rear widened portion. The second cured portion is bonded to and integrally formed with the first cured portion, and is configured to embed the braided fiber bundle therein to form two rails which respectively have the bundle segments therein. A method for making the bicycle saddle is also disclosed.

5 Claims, 9 Drawing Sheets

BICYCLE SADDLE AND METHOD FOR MAKING THE SAME

CROSS-REFERENCE TO RELATED APPLICATION

This application claims priority from Taiwanese invention patent application no. 109115078, filed on May 6, 2020.

FIELD

The disclosure relates to a saddle, more particularly to an integrally formed bicycle saddle and a method for making the same.

BACKGROUND

As shown in FIG. 1, a conventional bicycle saddle 1 includes a cushion 11, a cushion holder 12, and a supporting frame 13. The cushion 11 includes a cover 111 and a padding 112 which is covered by the cover 111 and which may be made of silicon rubber or a foam material. The cushion holder 12 is mounted on the supporting frame 13 and is configured to retain the cushion 11 to create the shape of the bicycle saddle 1. The supporting frame 13 is bent to have two rails for clamping a seatpost of a bicycle (not shown) therebetween.

FIG. 2 illustrates another conventional bicycle saddle 2 including a shell 21 which is made by curing carbon fiber prepregs, a shell retainer 22 which is configured to retain the shell 21 thereon, and a supporting frame 23 which is bent to have two rails for clamping a seatpost of a bicycle (not shown) therebetween. The shell 21 and the supporting frame 23 may be mounted to the shell retainer 22 using adhesive. However, a period of time after use, the bicycle saddle 2 might be broken at heterogeneous junctions among the shell 21, the shell retainer 22, and the supporting frame 23.

SUMMARY

Therefore, an object of the disclosure is to provide a more durable novel bicycle saddle and a method for making the same.

According to a first aspect of the disclosure, a bicycle saddle is provided for coupling to a seatpost, and includes a stack of fiber fabrics, a braided fiber bundle, and a cured member. The braided fiber bundle includes two bundle segments arranged beneath the stack of fiber fabrics. The cured member includes a first cured portion and a second cured portion. The first cured portion is configured to embed the stack of fiber fabrics therein such that the stack of fiber fabrics and the first cured portion together form a shell having a front nose portion and a rear widened portion. The second cured portion is bonded to and integrally formed with the first cured portion, and is configured to embed the braided fiber bundle therein such that the braided fiber bundle and the second cured portion together form a rail unit including two rails which respectively have the bundle segments therein and which are for clamping the seatpost therebetween. Each of the rails defines a side opening with the shell, and has a front rail end portion in position corresponding to the front nose portion, and a rear rail end portion in position corresponding to the rear widened portion.

According to a second aspect of the disclosure, a method for making a bicycle saddle includes the steps of:

a) providing a mold defining a mold cavity therein;

b) positioning a core insert in the mold cavity, the core insert having an upper major surface and a lower major surface;

c) positioning a stack of fiber fabrics in the mold cavity to permit the stack of fiber fabrics to be retained on the upper major surface of the core insert;

d) positioning two bundle segments of a braided fiber bundle in the mold cavity to permit each of the bundle segments to be retained on the lower major surface of the core insert and to be arranged in a front-rear direction such that two front end regions of the bundle segments are in contact with each other and extend out of a front edge of the core insert to be brought into contact with the stack of fiber fabrics, and such that two rear end regions of the bundle segments are spaced apart from each other and extend out of a rear edge of the core insert to be brought into contact with the stack of fiber fabrics;

e) introducing a curable resin material into the mold cavity to impregnate the stack of fiber fabrics and the braided fiber bundle with the curable resin material;

f) after step e), molding the impregnated stack of fiber fabrics and the impregnated bundle segments in the mold to cure the curable resin material so as to permit the impregnated stack of fiber fabrics to be molded into a shell and to permit impregnated bundle segments to be respectively molded into two rails connected to the shell, thereby obtaining the bicycle saddle;

g) removing the bicycle saddle and the core insert from the mold; and h) removing the core insert from the bicycle saddle.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
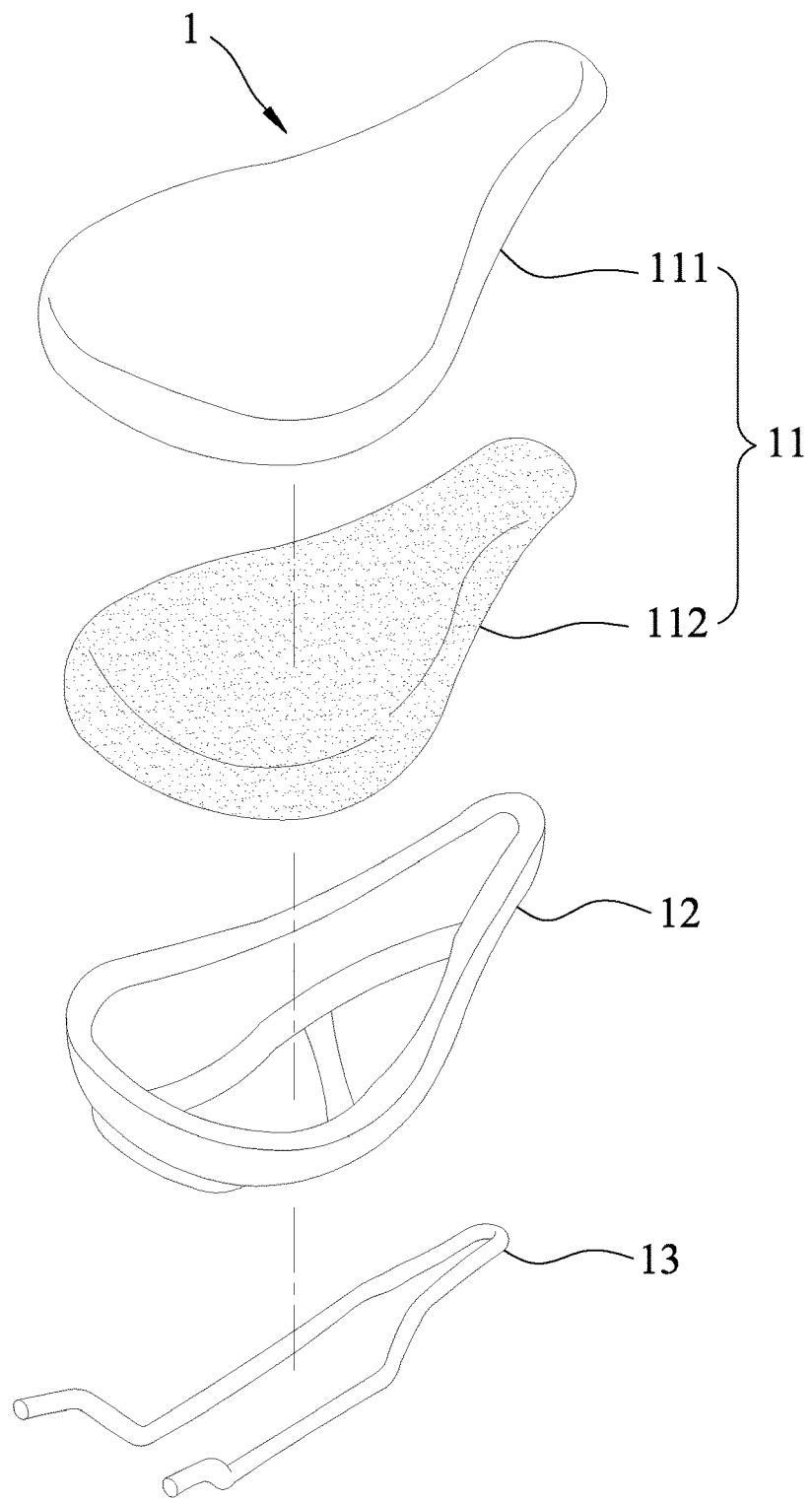
FIG. 1 is an exploded perspective view of a conventional bicycle saddle.
Figure 2:
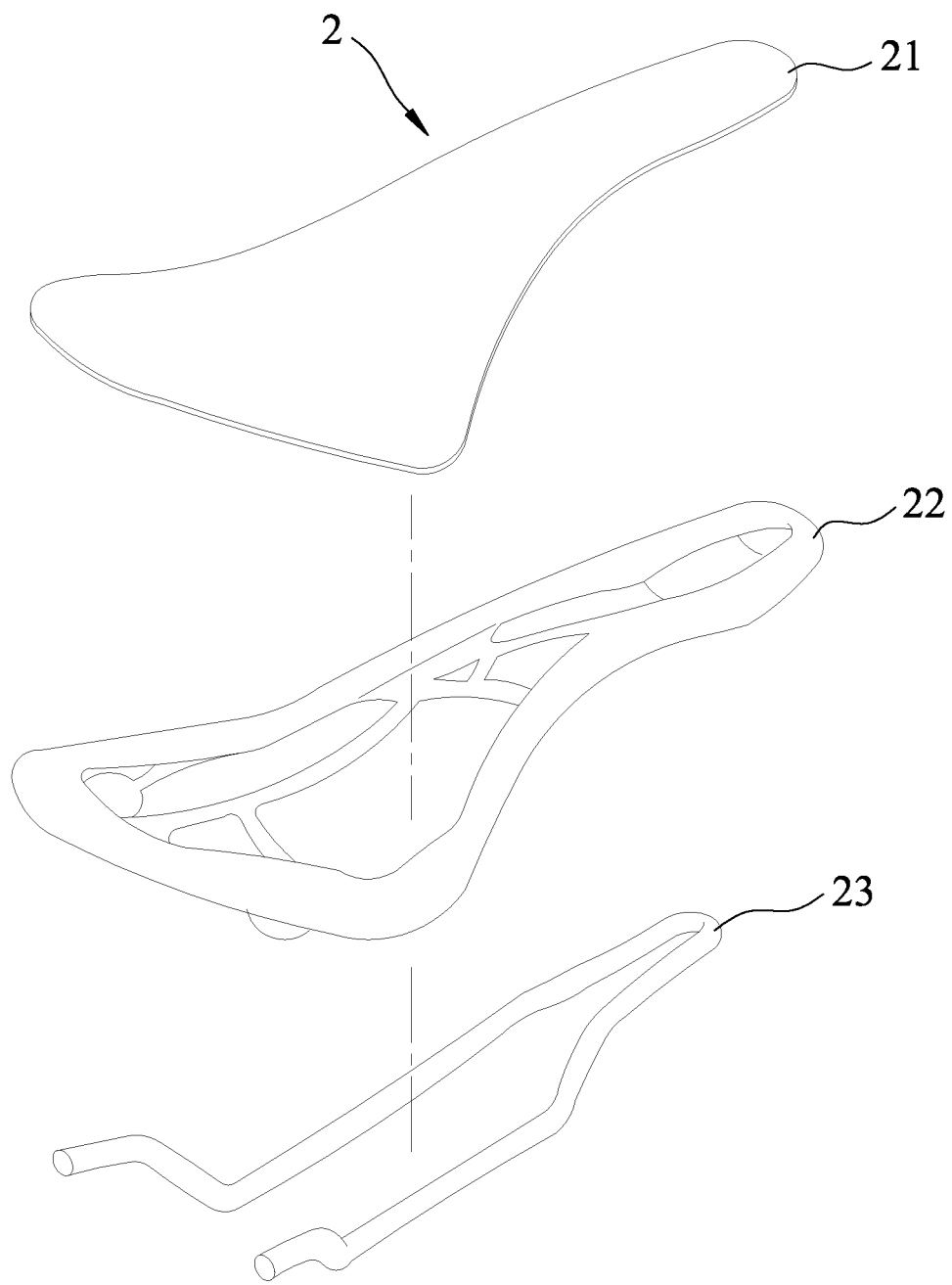
FIG. 2 is an exploded perspective view of another conventional bicycle saddle.
Figure 3:
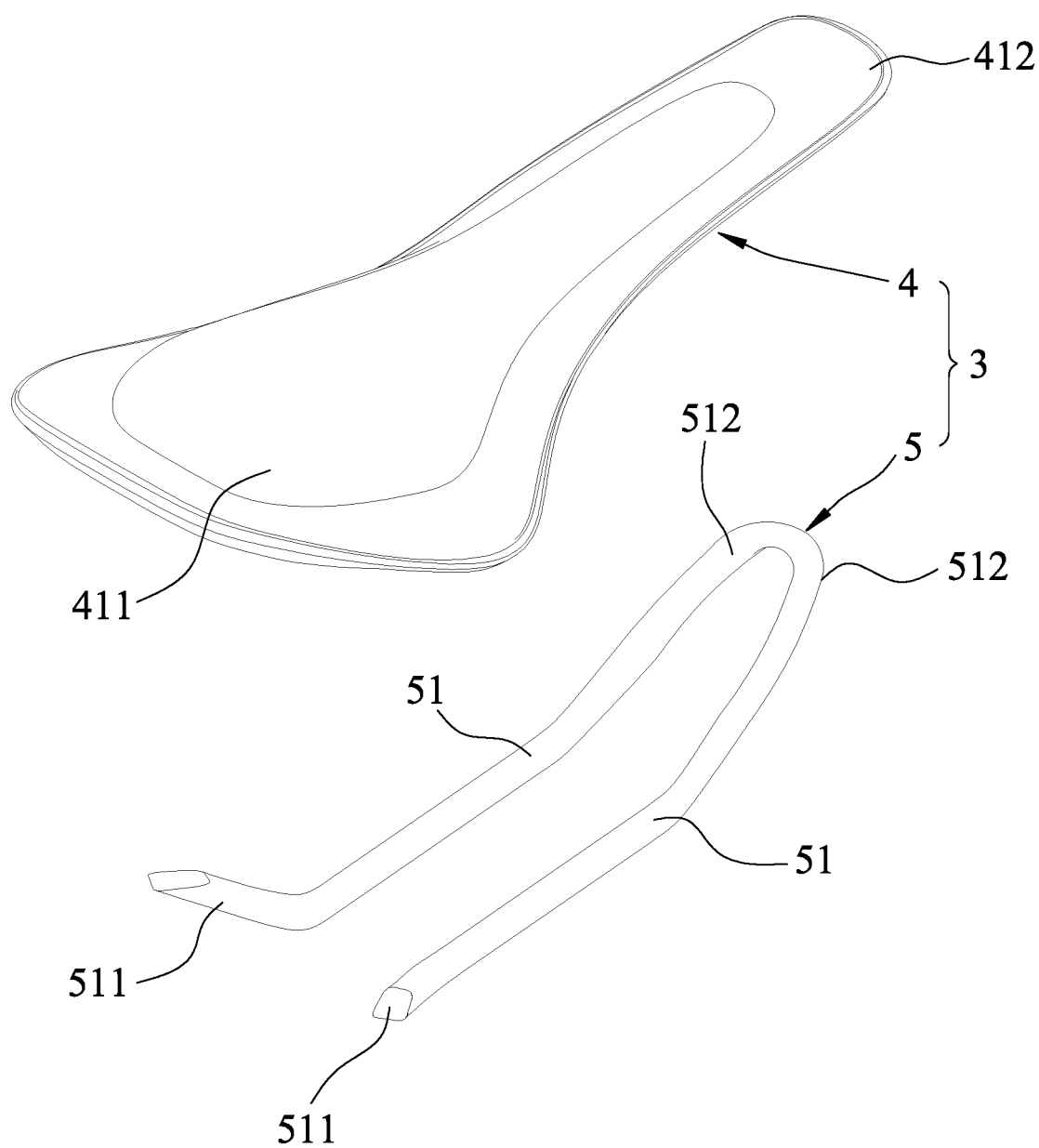
FIG. 3 is an exploded perspective view of a bicycle saddle according to an embodiment of the disclosure.
Figure 4:
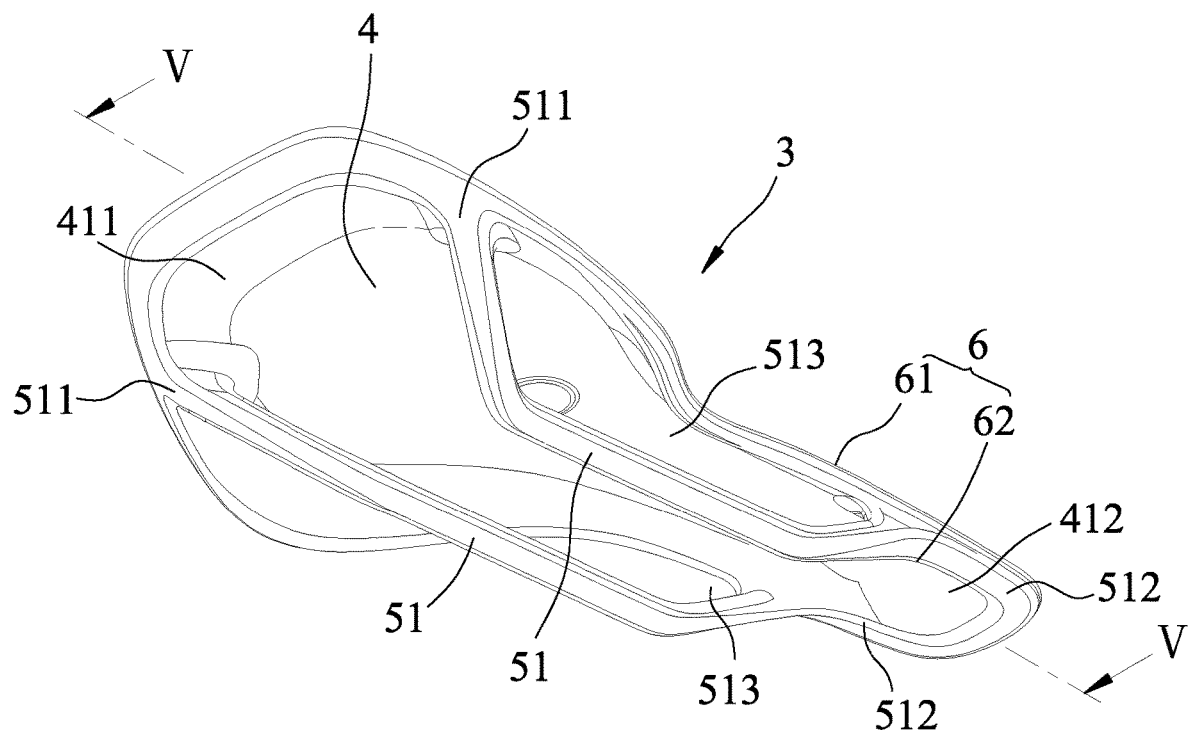
FIG. 4 is a perspective view of the bicycle saddle of the embodiment.
Figure 5:
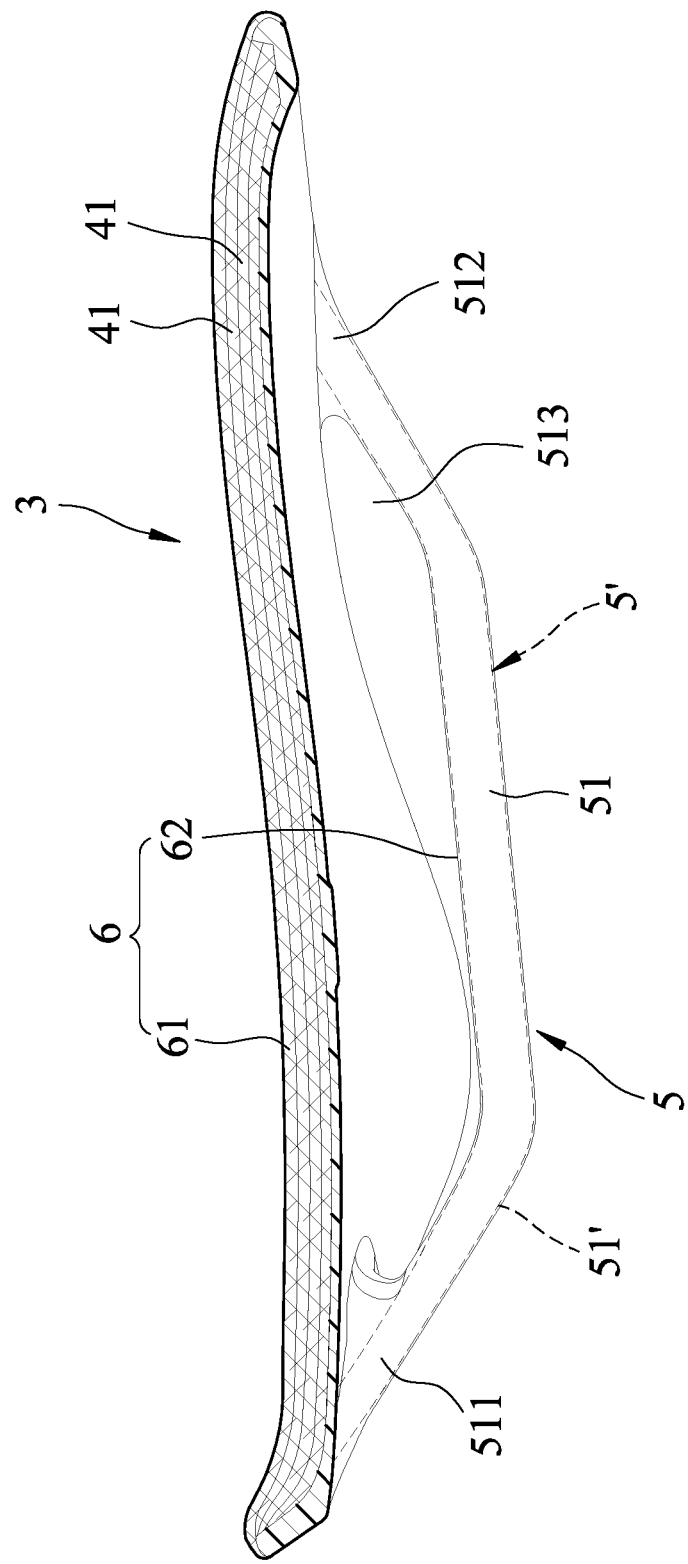
FIG. 5 is a cross-sectional view taken along line V-V of FIG. 4.

Referring to FIGS. 3 to 5, a bicycle saddle 3 according to an embodiment of the disclosure is provided for coupling to a seatpost of a bicycle (not shown), and is shown to include a stack of fiber fabrics 41, a braided fiber bundle 5', and a cured member 6. In an embodiment shown in FIG. 5, the stack of fiber fabrics 41 may include four pieces of the fiber fabrics 41. In other not-shown embodiments, the stack of fiber fabrics 41 may include two, three, or more than four pieces of the fiber fabrics 41.

In an embodiment, the fiber fabrics 41 may be made of carbon fiber yarns (12k). In certain embodiments, the fiber fabrics 41 may be made of glass fiber yarns or metal fiber yarns.

In an embodiment, fibers of two adjacent ones of the fiber fabrics 41 are arranged in two different directions.

The braided fiber bundle 5' includes two bundle segments 51' (only one is shown in FIG. 5) arranged beneath the stack of fiber fabrics 41. In an embodiment, the braided fiber bundle 5' is flexible, and may be made by braiding carbon fiber yarns (48k) and carbon fiber yarns (3k). In certain embodiments, the braided fiber bundle 5' may be made by braiding glass fiber yarns, metal fiber yarns, or blended yarns of glass fiber and metal fiber. Please note that the fiber fabrics 41 and the braided fiber bundle 5' shown in FIG. 5 are only for schematically illustrating their positions.

The cure member 6 includes a first cured portion 61 and a second cured portion 62. In an embodiment the cured member 6 is made of a curable resin material.

The first cured portion 61 is configured to embed the stack of fiber fabrics 41 therein such that the stack of fiber fabrics 41 and the first cured portion 61 together form a shell 4 having a front nose portion 412 and a rear widened portion 411.

The second cured portion 62 is bonded to and integrally formed with the first cured portion 61, and is configured to embed the braided fiber bundle 5' therein such that the braided fiber bundle 5' and the second cured portion 62 together form a rail unit 5 including two rails 51 which respectively have the bundle segments 51' therein and which are for clamping the seatpost therebetween. Each of the rails 51 defines aside opening 513 with the shell 4, and has a front rail end portion 512 in position corresponding to the front nose portion 412, and a rear rail end portion 511 in position corresponding to the rear widened portion 411.

In an embodiment shown in FIGS. 3 to 5, the front rail end portions 512 of the rails 51 are bonded to each other and are in bonding contact with the front nose portion 412. The rear rail end portions 511 of the rails 51 are spaced apart from each other, and are respectively in bonding contact with the rear widened portion 411.

Figure 6:
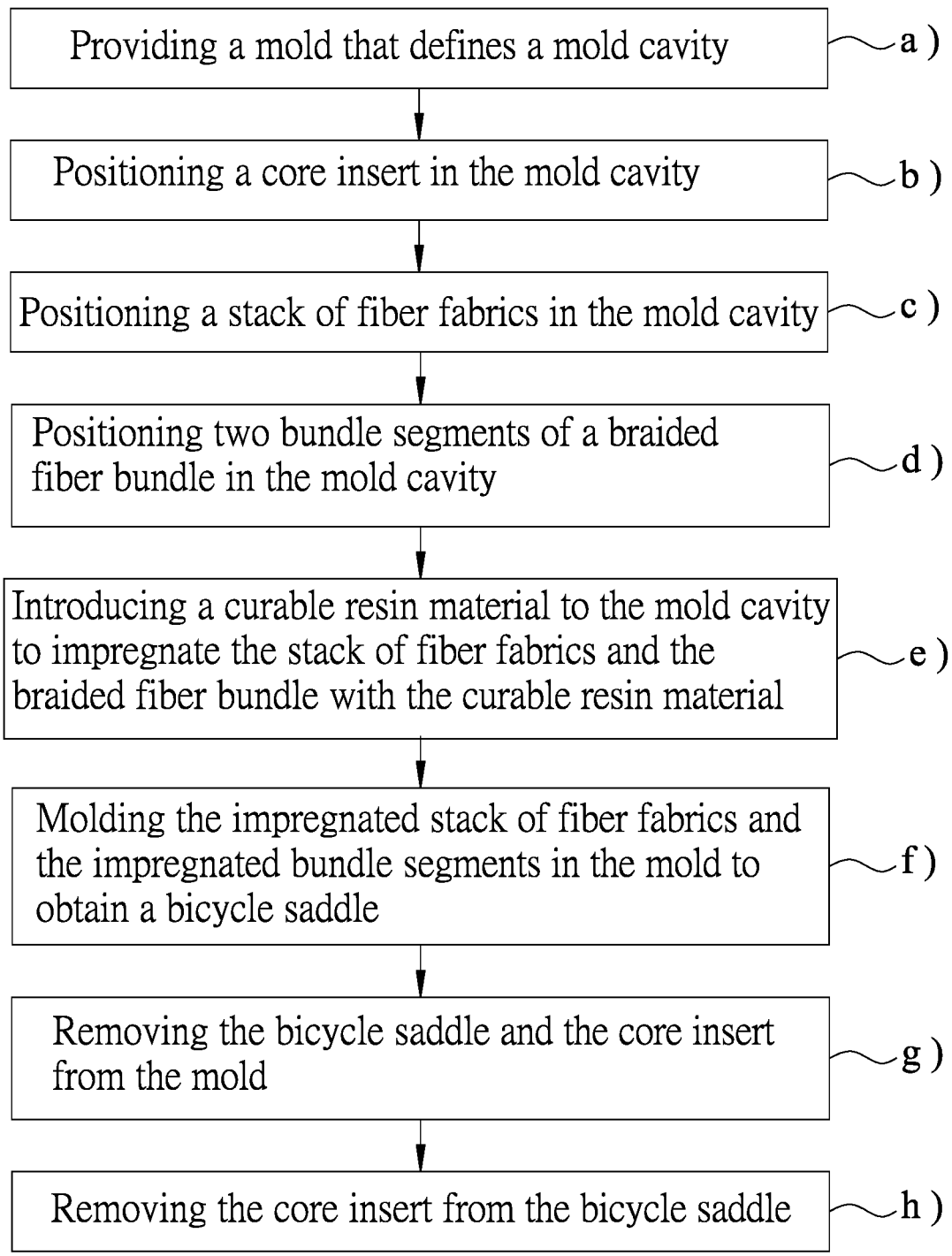
FIG. 6 is a flow diagram illustrating a method for making a bicycle saddle according to an embodiment of the disclosure.

FIG. 6 illustrates a method for making the bicycle saddle 3. The method may include steps a) to h).

Figure 8:
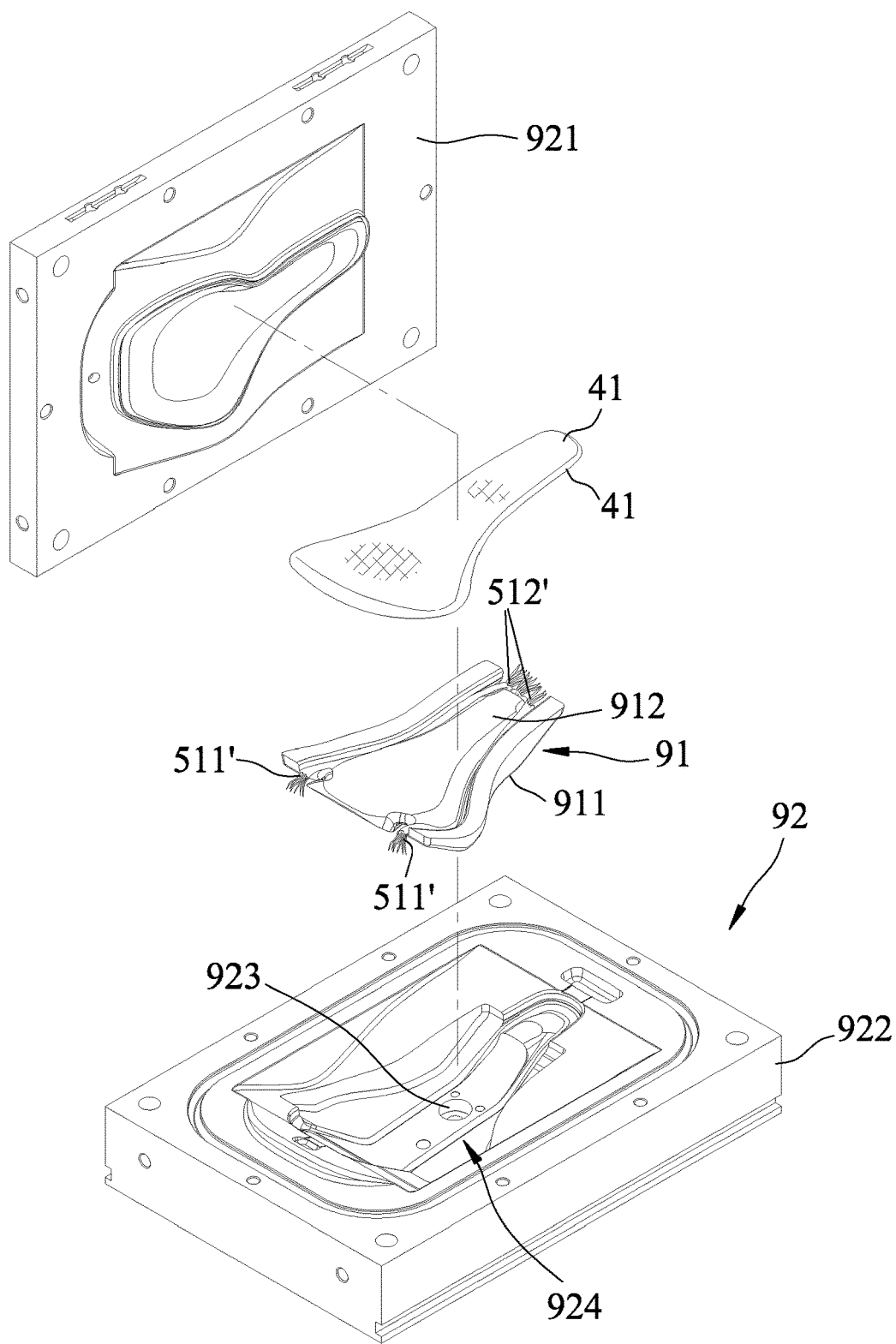
FIG. 8 is an exploded, schematic, perspective view illustrating how the bundle segments, the core insert, and a stack of fiber fabrics are to be positioned in a mold cavity between upper and lower mold segments of a mold.
Figure 9:
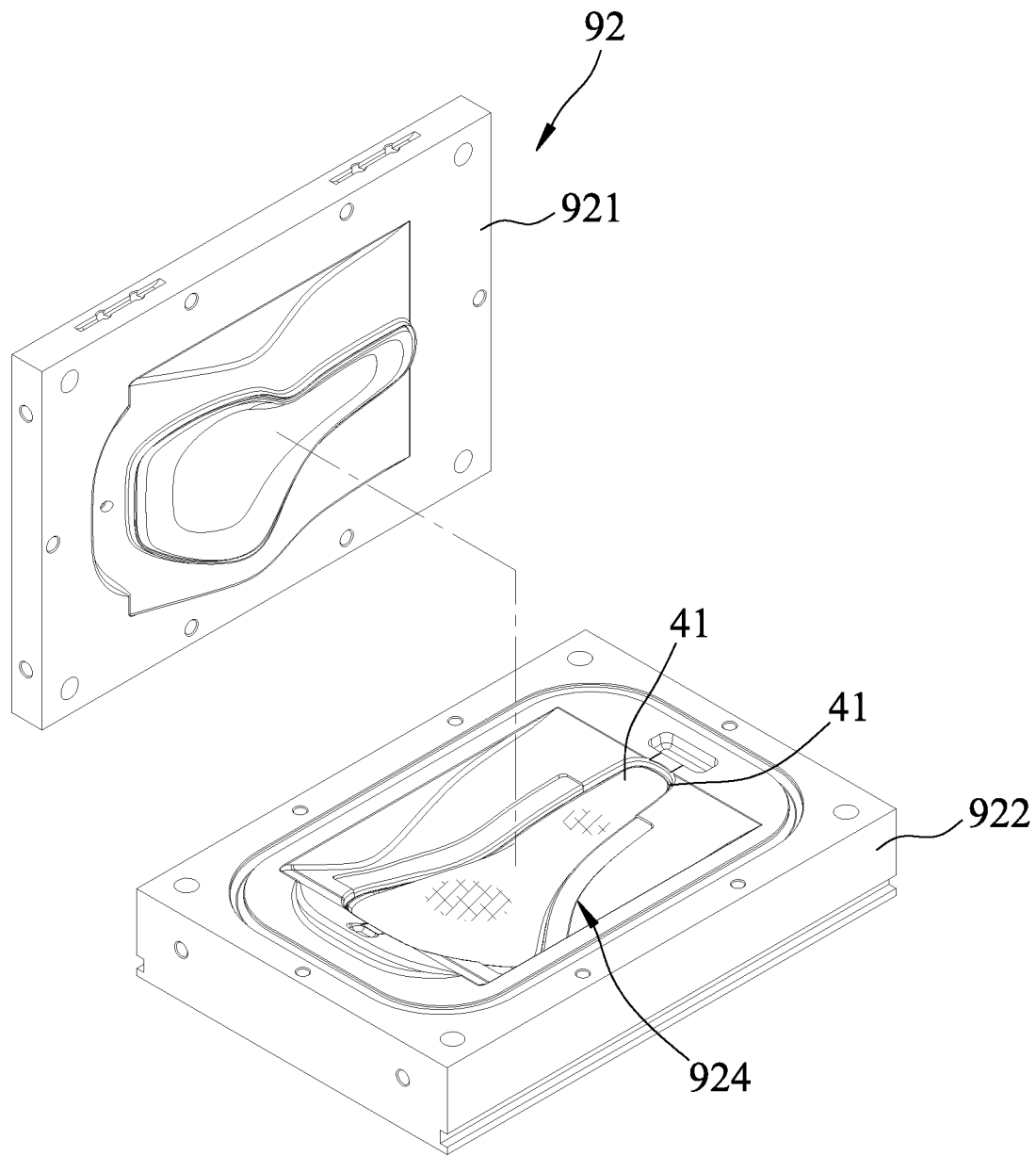
FIG. 9 is a schematic perspective view illustrating a state of the mold before closing.

In step a), as shown in FIG. 8, a mold 92 defining therein a mold cavity 924 is provided. In an embodiment shown in FIGS. 8 and 9, the mold 92 includes an upper mold segment 921 and a lower mold segment 922 which cooperatively define the mold cavity 924 therebetween.

In step b), a core insert 91 is positioned in the mold cavity 924. The core insert 91 has an upper major surface 912 and a lower major surface 911. In an embodiment shown in FIG. 8, in step b), the upper and lower major surfaces 912, 911 of the core insert 91 are positioned to confront the upper and lower mold segments 921, 922, respectively. In an embodiment, the core insert 91 is made of wax.

In step c), the stack of fiber fabrics 41 are positioned in the mold cavity 924 to permit the stack of fiber fabrics 41 to be retained on the upper major surface 912 of the core insert 91. In an embodiment shown in FIGS. 8 and 9, in step c), the stack of fiber fabrics 41 are retained between the upper mold segment 921 and the upper major surface 912 of the core insert 91.

In step d), the two bundle segments 51' of the braided fiber bundle 5' are positioned in the mold cavity 924 to permit each of the bundle segments 51' to be retained on the lower major surface 911 of the core insert 91 and to be arranged in a front-rear direction such that two front end regions 512' of the bundle segments 51' are in contact with each other and extend out of a front edge of the core insert 91 to be brought into contact with the stack of fiber fabrics 41, and such that two rear end regions 511' of the bundle segments 51' are spaced apart from each other and extend out of a rear edge of the core insert 91 to be brought into contact with the stack of fiber fabrics 41. In an embodiment shown in FIGS. 7 and 8, in step d), the bundle segments 51' of the braided fiber bundle 5' are retained between the lower mold segment 922 and the lower major surface 911 of the core insert 91. Please note that steps b), c), d) may be implemented at the same time.

Figure 7:
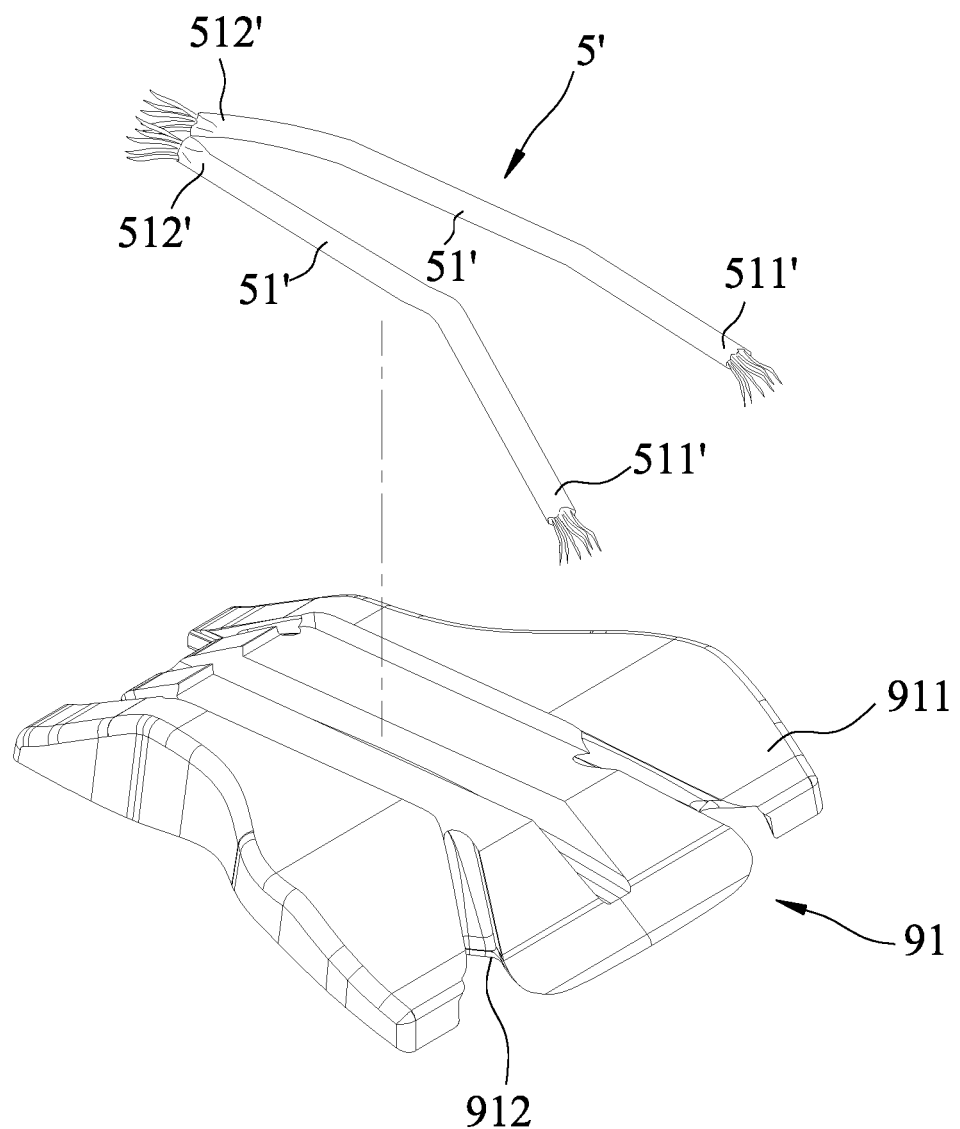
FIG. 7 is an exploded, schematic, perspective view illustrating how two bundle segments of a braided fiber bundle are to be positioned and retained on a lower major surface of a core insert.

In an embodiment shown in FIGS. 7 and 8, the two bundle segments 51' are prepared by cutting the braided fiber bundle 5' to permit each of the front and rear end regions 512', 511' of the bundle segments 51' to have a plurality of free fiber ends. Some of the free fiber ends at each of the front and rear end regions 512', 511' of the bundle segments 51' are cut off to ensure that the fibers at contact regions among the stack of the fiber fabrics 41 and the front and rear end regions 512', 511' of the bundle segments 51' may be well impregnated with the curable resin material when the curable resin material is introduced. In an embodiment, eight fiber free ends at each of the front and rear end regions 512', 511' of the bundle segments 51' are cut off.

In certain non-shown embodiments, the two bundle segments 51' are connected continuously, and the braided fiber bundle 5' may be bent into a substantially U or V shape to position the two bundle segments 51' between the core insert 91 and the lower mold segment 922.

Before step e), the mold cavity 924 is sealed by closing the mold 92.

In step e), the curable resin material (not shown) is introduced into the mold cavity 924 to impregnate the stack of fiber fabrics 41 and the braided fiber bundle 5' with the curable resin material. In this embodiment, the curable resin material is a thermoset resin and may be cured at a temperature ranging from 80° C. to 140° C.

In an embodiment shown in FIG. 8, the curable resin material is introduced into the mold cavity 924 through an injection duct 923 formed in the lower mold segment 922.

Step f) is implemented after step e). In step f), the impregnated stack of fiber fabrics 41 and the impregnated bundle segments 51' are molded in the mold 92 to cure the curable resin material so as to permit the impregnated stack of fiber fabrics 41 to be molded into a shell 4 and to permit impregnated bundle segments 51' to be respectively molded into two rails 51 connected to the shell 4, thereby obtaining the bicycle saddle 3.

In step g), the bicycle saddle 3 and the core insert 91 are removed from the mold 92. In details, in step g), the upper mold segment 91 is moved apart from the lower mold segment 92 to open the mold cavity 924, and then the bicycle saddle 3 and the core insert 91 may be removed from the lower mold segment 92.

In step h), the core insert 91 is removed from the bicycle saddle 3. In this embodiment, because the core insert 91 is made of wax, the bicycle saddle 3 may be obtained by melting the wax and then scraping the residue wax from the bicycle saddle 3. In certain embodiments, the core insert 91 may be made of fusible alloys or foam material such as expanded polystyrene (EPS), expanded polypropylene (EPP), or expandable polystyrene copolymer (EPO), and may be removed from the bicycle saddle 3 using a machine tool.

In sum, the bicycle saddle 3 of the disclosure may be made using the above simple method. In addition, the stack of fiber fabrics 41 and the braided fiber bundle 5' for constituting the main structure of the bicycle saddle 3 are embedded in the same integral material. Therefore, the bicycle saddle 3 does not have any heterogeneous junction, and may have improved structural strength and be more durable.

In the description above, for the purposes of explanation, numerous specific details have been set forth in order to provide a thorough understanding of the embodiment (s) . It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic maybe included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) t is intended to cover various arrangements included within the spirit and scope of the broadest interpretation so as to encompass all such modifications and equivalent arrangements.

What is claimed is:

1. A method for making a bicycle saddle, comprising the steps of:
    a) providing a mold defining a mold cavity therein;
    b) positioning a core insert in the mold cavity, the core insert having an upper major surface and a lower major surface;
    c) positioning a stack of fiber fabrics in the mold cavity to permit the stack of fiber fabrics to be retained on the upper major surface of the core insert;
    d) positioning two bundle segments of a braided fiber bundle in the mold cavity to permit each of the bundle segments to be retained on the lower major surface of the core insert and to be arranged in a front-rear direction such that two front end regions of the bundle segments are in contact with each other and extend out of a front edge of the core insert to be brought into contact with the stack of fiber fabrics, and such that two rear end regions of the bundle segments are spaced apart from each other and extend out of a rear edge of the core insert to be brought into contact with the stack of fiber fabrics;
    e) introducing a curable resin material into the mold cavity to impregnate the stack of fiber fabrics and the braided fiber bundle with the curable resin material;
    f) after step e), molding the impregnated stack of fiber fabrics and the impregnated bundle segments in the mold to cure the curable resin material so as to permit the impregnated stack of fiber fabrics to be molded into a shell and to permit impregnated bundle segments to be respectively molded into two rails connected to the shell, thereby obtaining the bicycle saddle;
    g) removing the bicycle saddle and the core insert from the mold; and
    h) removing the core insert from the bicycle saddle.

2. The method according to claim 1,
    wherein the mold includes an upper mold segment and a lower mold segment which cooperatively define the mold cavity therebetween;
    wherein, in step b), the upper and lower major surfaces of the core insert are positioned to confront the upper and lower mold segments, respectively;
    wherein, in step c) , the stack of fiber fabrics are retained between the upper mold segment and the upper major surface of the core insert; and
    wherein, in step d), the bundle segments of the braided fiber bundle are retained between the lower mold segment and the lower major surface of the core insert.

3. The method according to claim 1, wherein, in step d), the two bundle segments are prepared by cutting the braided fiber bundle to permit each of the front and rear end regions of the bundle segments to have a plurality of free fiber ends.

4. The method according to claim 1, wherein the core insert is made of wax.

5. The method according to claim 1, wherein, in step c), fibers of two adjacent ones of the fiber fabrics are arranged in two different directions.

* * * * *